(12) United States Patent
Schenk et al.

(10) Patent No.: US 6,992,875 B2
(45) Date of Patent: Jan. 31, 2006

(54) ELECTRONIC DEVICE INCLUDING PARTS FORMING A VOLTAGE TRANSFORMER

(75) Inventors: Joachim Schenk, Meinersen-Ohof (DE); Volker Breunig, Ditzingen (DE)

(73) Assignee: Robert Bosch Gmbh, Stuttgart (DE)

( * ) Notice: Subject to any disclaimer, the term of this patent is extended or adjusted under 35 U.S.C. 154(b) by 65 days.

(21) Appl. No.: 10/267,248

(22) Filed: Oct. 9, 2002

(65) Prior Publication Data
US 2003/0085695 A1    May 8, 2003

(30) Foreign Application Priority Data
Oct. 9, 2001 (DE) ................. 101 49 738

(51) Int. Cl.
*H02H 7/00* (2006.01)
(52) U.S. Cl. ......................... 361/160; 361/18
(58) Field of Classification Search ............... 361/155, 361/156, 160, 166, 181, 183, 187, 190, 191, 361/18; 323/282, 283, 284; 363/13, 15, 363/34

See application file for complete search history.

(56) References Cited

U.S. PATENT DOCUMENTS

| | | | |
|---|---|---|---|
| 3,969,655 A | * | 7/1976 | Gertsch .................... 361/16 |
| 4,549,127 A | * | 10/1985 | Taylor et al. ............... 320/132 |
| 5,818,205 A | * | 10/1998 | Borho et al. ............... 323/282 |
| 5,930,104 A | * | 7/1999 | Kadah et al. ............... 361/187 |

OTHER PUBLICATIONS

U. Tietze and Ch. Schenk, "Halbleiterschaltungstechnik", ninth edition, Springer-Verlag, Berlin.

* cited by examiner

*Primary Examiner*—Brian Sircus
*Assistant Examiner*—Danny Nguyen
(74) *Attorney, Agent, or Firm*—Kenyon & Kenyon

(57) ABSTRACT

An electronic device, in particular a control unit including an electromagnetic actuator, whose coil is at the same time part of a voltage transformer. The coil is connected through a switch to an operating voltage potential or to a reference potential. A capacitor is also provided. The coil, the capacitor and the switch constitute a voltage transformer.

10 Claims, 2 Drawing Sheets

ELECTRONIC DEVICE INCLUDING PARTS FORMING A VOLTAGE TRANSFORMER

FIELD OF THE INVENTION

The present invention relates to an electronic device.

BACKGROUND INFORMATION

Electronic devices, for example in the form of control units of a motor vehicle, which include a relay, the relay including a coil which may be connected to a power source through a controllable switch, for example a transistor, and may thus be switched between an operating voltage potential and a reference potential. In motor vehicles and in other applications of the electronic device, voltage fluctuations may occur in the voltage supply of the power source, which may limit or interrupt the operation of the electronic device. To maintain acceptable operation of the electronic device, blocking capacitors are used for example, which may in addition include step-up switching regulators connected upstream from them. In addition a d.c. transformer is discussed in U. Tietze and Ch. Schenk, "Halbleiterschaltungstechnik" ("Semiconductor Circuit Engineering"), ninth edition, Springer-Verlag, Berlin, pp. 561 ff., in which a d.c. output voltage is set using a low-pass filter, which produces a mean time value. The magnitude of the output voltage may be specified by the pulse duty factor of a power switch of the voltage transformer.

SUMMARY OF THE INVENTION

The exemplary electronic device according to the present invention includes a capacitor, and the coil, the capacitor, and the switch constitute a voltage transformer. In this manner, the coil of the electromagnetic actuator which is already present anyway in the electronic device may also be used for voltage conversion. The same is true of the switch which is already provided anyway in the electronic device for activating the electronic regulating device, and which may now also be used for timing the voltage transformer. The costs of the voltage transformer to be implemented are also reduced in this manner. The power of existing voltage transformers may then be reduced, or they may even be dispensed with.

An exemplary embodiment results when the switch includes a circuit breaker which connects the coil to the operating voltage potential or to the reference potential, and when the switch also includes a diode via which the capacitor may be charged through the coil when the circuit breaker is open.

The switching operation may be timed using the circuit breaker by setting a predefined mark-to-space ratio. In this manner it is allowed for matching of the voltage conversion to a desired switching state of the electromagnetic actuator.

For example, the mark-to-space ratio may be chosen so that it is less than a predefined maximum value, the predefined maximum value is chosen so that the current strength in the coil is less than the making current of the electromagnetic actuator, at which the electromagnetic actuator is activated. In this manner voltage conversion may be implemented when the electromagnetic actuator is not activated.

The mark-to-space ratio may assume a predefined minimum value or exceed it, the predefined minimum value is chosen so that the average current in the coil exceeds or is equal to the holding current of the electromagnetic actuator, which is the minimum necessary to hold the switching state of the electromagnetic actuator after it is activated. In this manner a voltage conversion may be implemented when the electromagnetic actuator is switched on or activated.

The voltage generated by the voltage transformer may supply a processor of the electronic device. In this manner, prevention of impairment of the processor of the electronic device by voltage fluctuations in the voltage supply may be allowed, in particular in the power source. This ensures a constant supply of voltage to the processor of the electronic device, independent of voltage fluctuations in the voltage supply.

DETAILED DESCRIPTION

Figure 1:
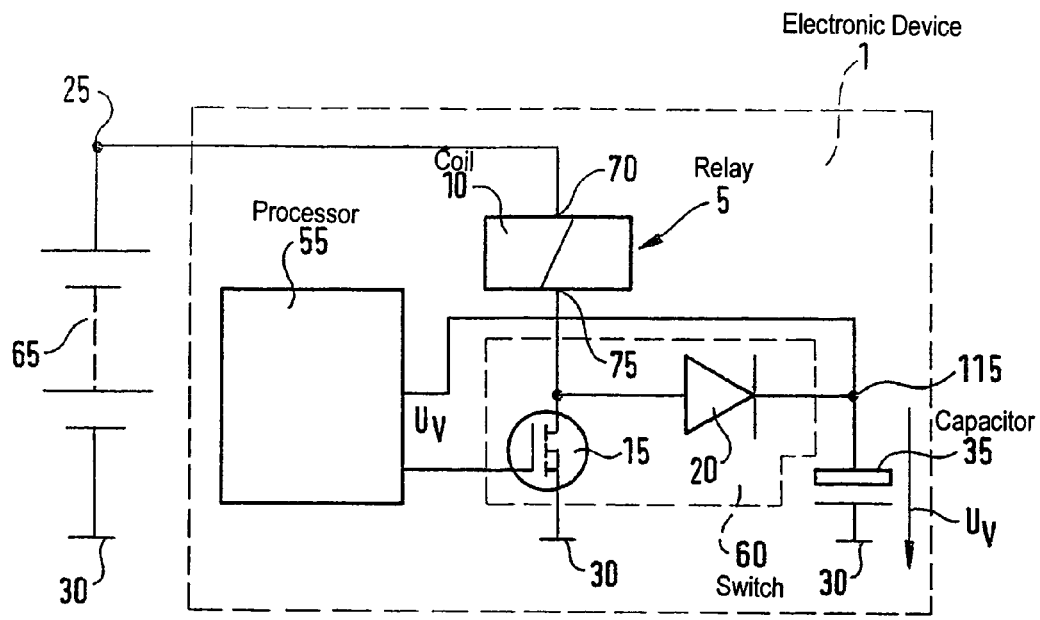
FIG. 1 shows a first exemplary embodiment of an electronic device according to the present invention.

In FIG. 1, 65 designates a d.c. source, for example a battery of a motor vehicle. Power source 65 produces an operating voltage potential 25 based on a reference potential 30. In addition, 1 in FIG. 1 designates an electronic device, for example a control unit of a motor vehicle. Electronic device 1 includes an electromagnetic actuator 5, which is exemplified below in the form of a relay, and of which, for the sake of clarity, only a coil 10 for switching relay 5 is shown. A first terminal 70 of coil 10 is connected to operating voltage potential 25. A second terminal 75 of coil 10 is connectable to reference potential 30 through a breaker gap of a controllable switch 15.

Controlled switch 15 constitutes a ground switch, since it is able to connect second terminal 75 of coil 10 to reference potential 30 or to interrupt this connection. Controlled switch 15 is activated by a processor 55 including input and output circuits, for example a microprocessor. Second terminal 75 of coil 10 is connected to an anode of a diode 20, whose cathode 115 is connected to reference potential 30 through a capacitor 35. The voltage across capacitor 35 may be made available as additional constant d.c. supply voltage $U_V$ to processor 55 in the event of failure of its main supply voltage, which is not shown in FIG. 1. Controlled switch 15 and diode 20 constitute a switch 60 which functions as a two-way switch, which draws second terminal 75 to reference potential 30 when controlled switch 15 is conductive. In this case no charging of capacitor 35 occurs through diode 20. When controlled switch 15 is blocked, capacitor 35 is charged by the energy stored in coil 10 and through diode 20. Switch 60 is therefore a two-way switch. Controlled switch 15 may be configured as a transistor, for example as a bipolar transistor or as a field effect transistor, as depicted in FIG. 1 using the example of a MOS field effect transistor.

As described above, second terminal 75 of coil 10 is drawn to reference potential 30 when the breaker gap of controlled switch 15 is made conductive. The inductivity of coil 10 tends to preserve the current which flows through coil 10 when controlled switch 15 is conductive even after controlled switch 15 is switched off, i.e. after the breaker gap of controlled switch 15 is blocked, so that after the breaker gap of controlled switch 15 is blocked the energy contained in coil 10 flows through diode 20 into capacitor 35 and charges it. At this moment the inductivity of coil 10 itself represents a voltage source, so that connecting power source 65 and coil 10 in series results in a higher voltage at capacitor 35 than the voltage of power source 65.

A voltage transformer is thus constituted by coil 10, switch 60 and capacitor 35. This voltage transformer is what is referred to as a step-up transformer, as discussed on pp. 563 ff. of the literature by U. Tietze and Ch. Schenk discussed above, and thus its manner of functioning is available from other systems.

Figure 4:
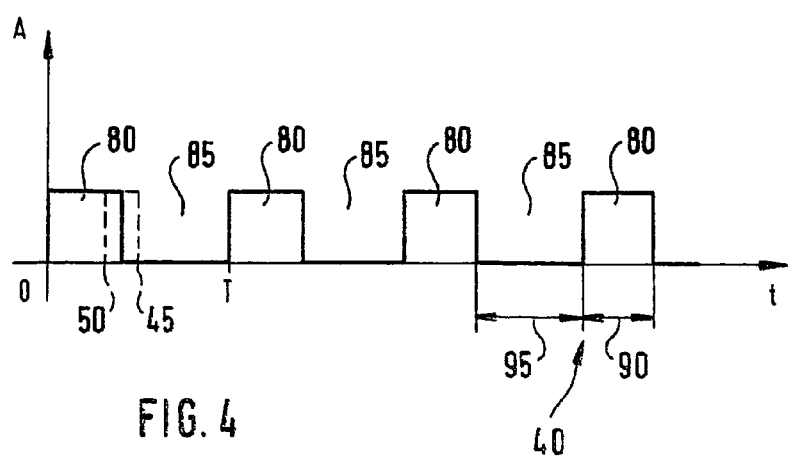
FIG. 4 shows a representation of a mark-to-space ratio for actuating a controlled switch of an exemplary electronic device according to the present invention.

To produce a constant d.c. voltage supply $U_V$ for processor 55, it is necessary here to actuate controlled switch 15 cyclically, according to FIG. 4. FIG. 4 shows amplitude A over time t of the control signal supplied for controlled switch 15 by processor 55. Control pulses 80 and spaces 85 alternate periodically here, the duration of the period is T. The ratio between pulse length 90 and space length 95 produces a mark-to-space ratio 40. If a predefined maximum 45 is reached for pulse length 90, a mean current strength is reached in coil 10, which is sufficient to activate relay 5 and is referred to as the making current. If pulse length 90 remains below this predefined maximum value 45, then relay 5 is not activated, so that the voltage conversion described earlier occurs with relay 5 de-activated or switched off. If predefined maximum value 45 is reached or exceeded by pulse length 90, voltage conversion occurs with relay 5 activated.

On the other hand, when relay 5 is activated, pulse length 90 may be reduced again to a predefined minimum value 50, which is less than predefined maximum value 45, without relay 5 switching off; that is, the activation of relay 5 remains intact. Only when pulse length 90 drops below predefined minimum value 50 is the activation of relay 5 lost, and relay 5 switches off. Relay 5 thus exhibits a behavior characterized by hysteresis. The mean current resulting through coil 10 at predefined minimum value 50 for pulse length 90 is referred to as the holding current or minimum holding current, and is the minimum current which is necessary to hold relay 5 in the switched state after its activation. A requirement in the aforementioned cases is that the period length T remain constant. This is because the critical factor is not pulse length 90 itself, but its relationship to space length 95, as described above. Thus when period length T remains constant, predefined maximum value 45 for pulse length 90 results in a predefined maximum value for mark-to-space ratio 40. When period length T remains constant, predefined minimum value 50 for pulse length 90 results in a predefined minimum value for mark-to-space ratio 50.

Thus it is true in general that relay 5 is not activated when mark-to-space ratio 40 is lower than the prescribed maximum value for this ratio. The average current in coil 10 then remains smaller than the making current of relay 5, at which relay 5 is activated. On the other hand, mark-to-space ratio 40 may be chosen so that it assumes or exceeds the predefined minimum value for this ratio, in which case the strength of the current in coil 10 is greater than or equal to the holding current of relay 5, which is the minimum necessary to hold the relay in the switched state after it is activated. Mark-to-space ratio 40 may of course be adjusted in any other manner to a predefined value which is less than the predefined maximum value or is greater than or equal to the predefined minimum value for mark-to-space ratio 40. For example, pulse length 90 may remain constant and mark-to-space ratio 40 may be changed by varying period length T, i.e. by changing the clock speed. Analogously, space length 95 may be left constant and pulse length 90 may be varied, in which case period length T also changes. Additionally the predefined mark-to-space ratio 40 may be adjusted in a manner to vary both pulse length 90 and space 95, while taking into account the change in period length T.

The magnitude of d.c. supply voltage $U_V$ for processor 55 may be determined by the pulse duty factor with which controlled switch 15 is periodically closed, i.e. by the predefined or desired mark-to-space ratio 40. The low-pass filter formed by coil 10 and capacitor 35 provides for a mean value over time, and thus for the desired constant d.c. supply voltage $U_V$ at cathode 115 as the voltage supply for processor 55. Thus d.c. supply voltage $U_V$ produced by the voltage transformer supplies processor 55 of electronic device 1.

Figure 2:
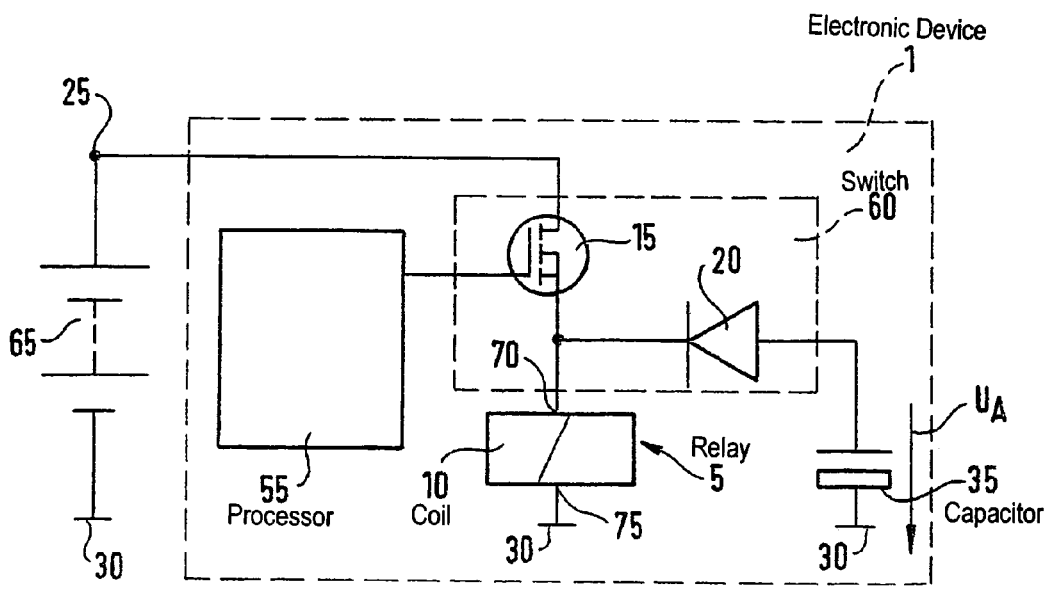
FIG. 2 shows a second exemplary embodiment of an electronic device according to the present invention.

FIG. 2 depicts a second exemplary embodiment of electronic device 1 according to the present invention, in which the same reference symbols designate the same elements as in FIG. 1. In contrast to the first exemplary embodiment according to FIG. 1, here first terminal 70 of coil 10 may be connected to operating voltage potential 25 via the breaker gap of controlled switch 15. Second terminal 75 of coil 10 is connected to reference potential 30. First terminal 70 of coil 10 is also connected to the cathode of diode 20, whose anode is connected via capacitor 35 to reference potential 30. As in the first exemplary embodiment, processor 55 actuates controlled switch 15.

In the second exemplary embodiment also, controlled switch 15 and diode 20 constitute two-way switch 60, which functions together with coil 10 and capacitor 35 as an inverting voltage transformer, the function of which is discussed for example in the aforenamed literature by U. Tietze and Ch. Schenk, pp. 570 ff. Here the voltage $U_A$ formed at capacitor 35 has the opposite arithmetic sign compared to the voltage of power source 65. Voltage $U_A$ at capacitor 35 may be used in turn by electronic device 1, but also outside of electronic device 1. This is of course also true in principle for the first exemplary embodiment according to FIG. 1, where the supply of power to processor 55 was cited merely as an example. As in the case of the first exemplary embodiment, controlled switch 15 is actuated in the second exemplary embodiment cyclically with a correspondingly predefined mark-to-space ratio 40 according to FIG. 4, so that due to the low-pass effect of coil 10 and capacitor 35 a constant d.c. voltage $U_A$ results at capacitor 35.

Figure 3:
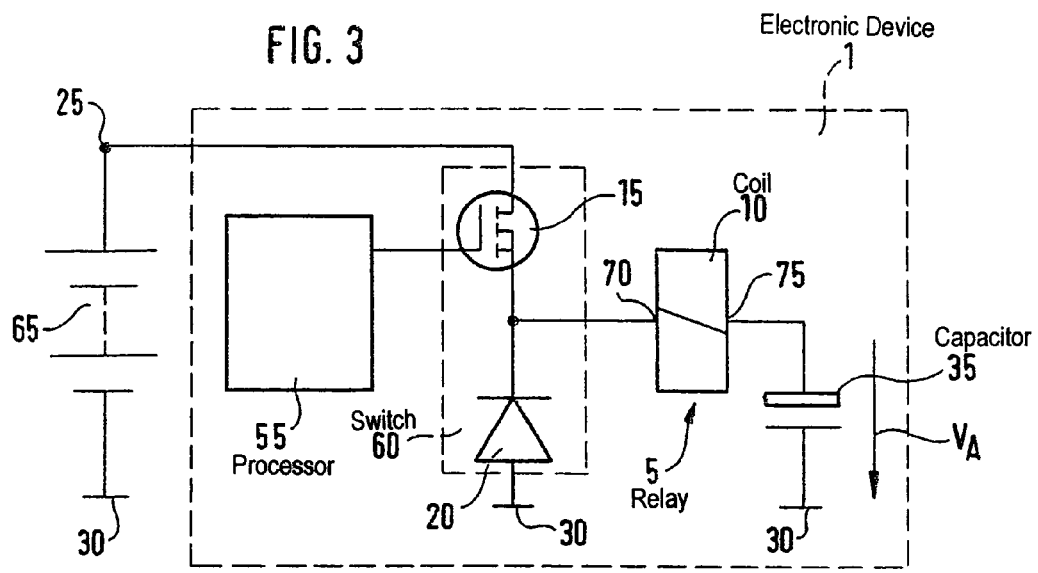
FIG. 3 shows a third exemplary embodiment of an electronic device according to the present invention.

FIG. 3 depicts a third exemplary embodiment, in which the same reference symbols designate the same elements as in the previous exemplary embodiments. According to FIG. 3, as in the case of the second exemplary embodiment, first terminal 70 of coil 10 is connectable to operating voltage potential 25 via the breaker gap of controlled switch 15. Controlled switch 15 is activated by processor 55. In contrast to the second exemplary embodiment according to FIG. 2, second terminal 75 of coil 10 is connected to reference potential 30 through capacitor 35. An additional difference compared to the second exemplary embodiment is that first terminal 70 of coil 10 is connected to the cathode of diode 20, whose anode is connected to reference potential 30. Controlled switch 15 and diode 20 again constitute a two-way switch 60. In this case, two-way switch 60, coil 10 and capacitor 35 constitute a step-up voltage transformer, whose principle is discussed in the aforenamed literature by U. Tietze and Ch. Schenk from page 563 on. Here too, controlled switch 15 is activated cyclically with a predefined mark-to-space ratio 40, so that voltage $U_A$ present at capacitor 35 is again a constant d.c. voltage and in this case has the same arithmetic sign as the voltage of power source 65.

However, voltage $U_A$ at capacitor 35 may have any value between 0 and the voltage of power source 65, depending on the pulse duty factor. Voltage $U_A$ at capacitor 35 may again be used within electronic device 1, for example as supply voltage for processor 55, or outside of electronic device 1.

Using the voltage transformer of electronic device 1 allows for prevention of fluctuations in the voltage of power source 65 from limiting or interrupting the operation of a component supplied by the voltage transformer, in the first exemplary embodiment the operation of processor 55, since it allows for compensation of these voltage fluctuations through the cyclic operation of controlled switch 15 and the low-pass filtering of coil 10 and capacitor 35, insofar as the timing and amplitude of these voltage fluctuations occur within certain limits.

What is claimed is:

1. An electronic device comprising:

a switch;

an electromagnetic actuator including a coil that is connectable through the switch to one of an operating voltage potential and a reference potential;

a capacitor;

wherein the coil, the capacitor and the switch are configured to form a voltage transformer;

wherein the switch includes a circuit breaker that connects the coil to one of the operating voltage potential and the reference potential, and the switch includes a diode through which the capacitor is charged through the coil when the circuit breaker is open;

wherein a switching process is cyclical with a predefined mark-to-space ratio being set; and wherein the predefined mark-to-space ratio is less than a predefined maximum value, and the predefined maximum value is chosen to avoid activation of the electromagnetic actuator and such that a current in the coil is less than a making current of the electromagnetic actuator at which the electromagnetic actuator is activated.

2. The electronic device of claim 1, wherein the electronic device includes a control unit.

3. The electronic device of claim 1, wherein the electromagnetic actuator includes a relay.

4. The electronic device of claim 1, wherein the voltage transformer includes a step-down transformer.

5. The electronic device of claim 1, wherein the voltage transformer includes a step-up transformer.

6. The electronic device of claim 1, wherein the voltage transformer includes an inverting transformer.

7. The electronic device of claim 1, wherein the circuit breaker includes a controlled switch.

8. The electronic device of claim 7, wherein the controlled switch includes a transistor.

9. The electronic device of claim 1, wherein the predefined mark-to-space ratio one of assumes and exceeds a predefined minimum value, the predefined minimum value is chosen such that a mean current in the coil is at least equal to a holding current of the electromagnetic actuator, which is a minimum necessary to hold a switched state of the electromagnetic actuator after it is activated.

10. The electronic device of claim 1, wherein a voltage generated by the voltage transformer supplies a processor of the electronic device.

* * * * *